United States Patent
Cherala et al.

(10) Patent No.: US 10,470,043 B1
(45) Date of Patent: Nov. 5, 2019

(54) THREAT IDENTIFICATION, PREVENTION, AND REMEDY

(71) Applicant: Wells Fargo Bank, N.A., Charlotte, NC (US)

(72) Inventors: Saipavan K. Cherala, Telangana (IN); Rameshchandra Bhaska Ketharaju, Telangana (IN); Sumanth Kumar Charugundla, Telangana (IN); Damaraju P. Vittal, Telangana (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 299 days.

(21) Appl. No.: 14/945,522

(22) Filed: Nov. 19, 2015

(51) Int. Cl.
| | | |
|---|---|---|
| *G06F 21/00* | (2013.01) | |
| *H04L 29/06* | (2006.01) | |
| *H04W 12/12* | (2009.01) | |
| *G06F 21/31* | (2013.01) | |
| *G06F 21/32* | (2013.01) | |
| *H04W 12/06* | (2009.01) | |
| *H04W 12/08* | (2009.01) | |

(52) U.S. Cl.
CPC .......... *H04W 12/12* (2013.01); *G06F 21/316* (2013.01); *G06F 21/32* (2013.01); *H04L 63/08* (2013.01); *H04L 63/0861* (2013.01); *H04W 12/06* (2013.01); *H04W 12/08* (2013.01)

(58) Field of Classification Search
CPC ..... H04W 12/12; H04W 12/06; H04W 12/08; G06F 21/32; G06F 21/316; H04L 63/08; H04L 63/0861
See application file for complete search history.

(56) References Cited

U.S. PATENT DOCUMENTS

| | | | | |
|---|---|---|---|---|
| 6,895,502 B1* | 5/2005 | Fraser | ............... | G06Q 20/388 713/168 |
| 7,870,614 B1* | 1/2011 | Duhaime | ............ | G06Q 20/383 726/28 |
| 8,285,999 B1* | 10/2012 | Ghose | ................ | G06F 21/54 713/170 |
| 9,767,263 B1* | 9/2017 | McInerny | ............ | G06F 21/31 |
| 10,235,527 B1* | 3/2019 | Dalessio | ............... | G06F 21/577 |
| 2002/0019879 A1* | 2/2002 | Jasen | .................... | H04L 47/10 709/240 |
| 2007/0294183 A1* | 12/2007 | Camenisch | ............ | G06Q 20/06 705/65 |
| 2009/0037983 A1* | 2/2009 | Chiruvolu | ............... | G06F 21/31 726/4 |
| 2009/0144823 A1* | 6/2009 | Lamastra | ............... | H04L 51/12 726/22 |

(Continued)

*Primary Examiner* — Mohammad A Siddiqi

(74) *Attorney, Agent, or Firm* — Walter Haverfield LLP; James J. Pingor

(57) ABSTRACT

Theft identification, prevention, and remedy are provided. A determination is made that a client device has been compromised. When the device makes the determination, a message is conveyed to the server and the server replies with a security challenge. When the server makes the determination, the security challenge is automatically sent to the device. An intelligence manager on the device attempts to answer the security question without interaction from the user. If there is an anomaly, a challenge is output to the user. Based on a false response to the challenge, a current data stream may be disrupted and removed from the device. Further, other devices in the network may be notified about the compromised device.

20 Claims, 11 Drawing Sheets

(56) References Cited

U.S. PATENT DOCUMENTS

| | | | |
|---|---|---|---|
| 2010/0077209 A1* | 3/2010 | Broder | G06F 21/46 713/168 |
| 2012/0323717 A1* | 12/2012 | Kirsch | G06Q 20/0855 705/26.1 |
| 2013/0085942 A1* | 4/2013 | Shirol | G06Q 20/108 705/44 |
| 2013/0191899 A1* | 7/2013 | Eldefrawy | H04L 9/3228 726/6 |
| 2014/0351070 A1* | 11/2014 | Christner | G06Q 30/0201 705/18 |
| 2016/0094551 A1* | 3/2016 | Sugihara | H04L 63/1466 726/7 |

\* cited by examiner

THREAT IDENTIFICATION, PREVENTION, AND REMEDY

BACKGROUND

Advances in communication technology has allowed businesses, machines, and individuals to perform transactions online (e.g., over the Internet), including financial transactions. In an attempt to secure confidential and/or sensitive information during these online transactions, authentication and authorization is used. Authentication is the process of determining whether a person is the actual person they are asserting themselves to be, or whether the device is the actual device being used to perform the transaction. A common type of authentication is based on logon passwords or other credentials, which may be subject to fraud. On the user side, an occurrence of fraud (e.g., compromised financial data, monetary loss, identity theft, and so on) has been blamed for user dissatisfaction. On the organizational or network side, fraud is an on-going concern during the online transaction.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

An aspect relates to a system that includes a processor that executes computer executable components stored in a memory. The computer executable components may include an intelligence manager, installed on a client device, that verifies an identity of the client device and a user of the client device for access to a secure network. The computer executable components may also include a data manager that determines a transaction initiated at the client device is suspect based on the type of data requested or the amount of data requested. Further, the computer executable components may include a termination module that selectively terminates the transaction based on a failure of a security challenge output in response to the suspect transaction.

Another aspect relates to a method that may include determining, by a system comprising a processor, that a client device has been compromised and transmitting, by the system, a notification to a server that the client device has been compromised. The method may also include determining, by the system, if a response to a security challenge is available. The security challenge may be received from the server based on the notification. Further, the method may include outputting, by the system, another challenge based on the response to security challenge not being available. The method may also include erasing, by the system, a current data stream based on a negative response to the other challenge.

A further aspect relates to a method that may include receiving, by a system comprising a processor, a verification message from a server based on a determination that a device has been compromised. The verification message may include a security challenge. The method may also include determining, by the system, if a response to a security challenge is available. The security challenge may be received from the server. Further, the method may include outputting, by the system, another challenge based on the response to the security challenge not being available. The method may also include removing, by the system, a current data stream based on a negative response to the other challenge.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

The various aspects disclosed herein provide threat identification, threat prevention, and/or threat remedy. The threat identification may be provided at substantially the same time as a device is establishing a connection with a network. The threat prevention may be provided while the device is already connected to the network. Further, the threat remedy may be provided to facilitate data protection to the network.

Figure 1:
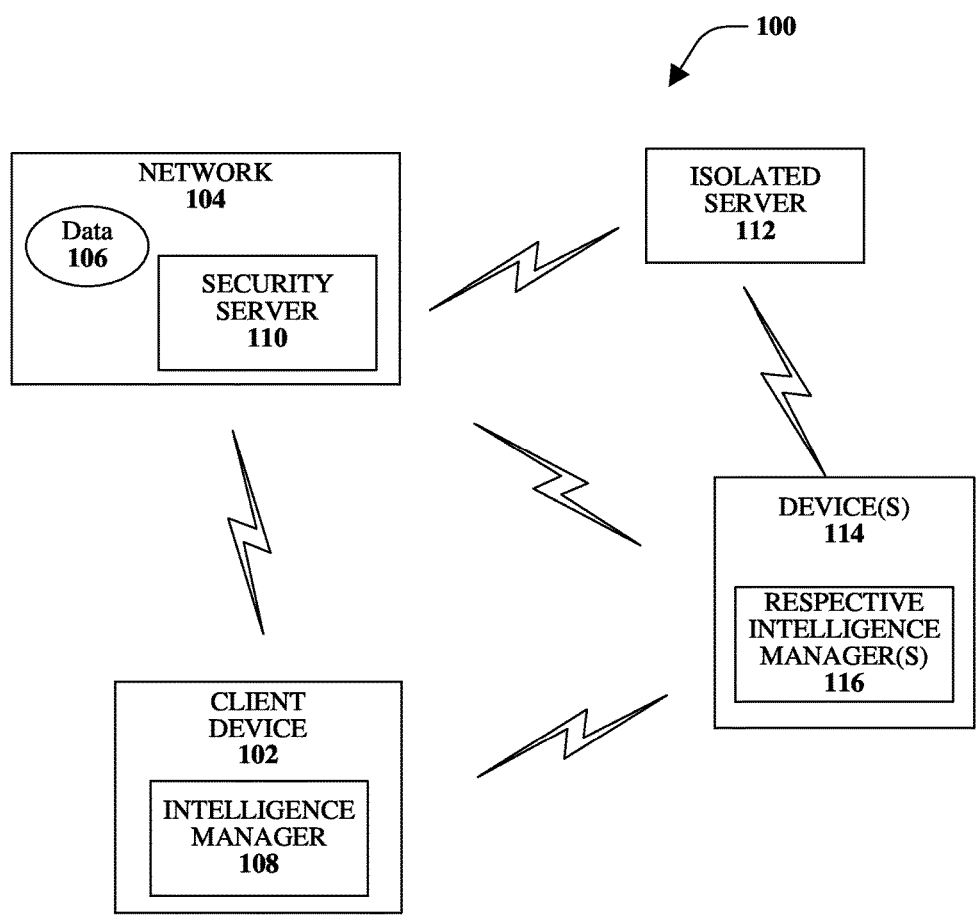
FIG. 1 illustrates an example, non-limiting schematic representation of an environment for providing threat identification, prevention, and/or remedy, according to various aspects.

FIG. 1 illustrates an example, non-limiting schematic representation of an environment 100 for providing threat identification, prevention, and/or remedy, according to various aspects. The system 100 may be implemented, at least in part, on a client device 102. The client device 102 may be any device that is attempting to establish a connection with a network 104, that has established a connection with the network 104, and/or that is attempting to obtain data 106 from the network 104.

In accordance with various aspects, the network 104 may be associated with a financial entity or another entity. As used herein an "entity" or a "financial entity" may refer to a financial institution, such as a bank, persons operating on behalf of the financial institution, and/or communication devices managed by the financial institution and/or the persons operating on behalf of the financial institution. Additionally or alternatively, the entity may be a third party monitoring source or another type of entity that has a trusted relationship with the financial institution.

Further, although the various aspects are discussed with respect to a financial entity, the aspects are not limited to this implementation. Instead, the network 104 may be associated with a number of different types of entities. For example, the entity may be a health care provider, a retail brick and mortar store, an online shopping website, a utility, an employer, a university, and so on.

The client device 102 may be various devices, which may include any objects included in an Internet of Things (IoT). The IoT is a term for a network of physical objects (or things) that are embedded with electronics, software, sensors, and network connectivity. Thus, the IoT includes all devices (or objects) that are able to collect and exchange data. In a specific implementation, the client device 102 may be a mobile device. The mobile device (or other object) may contain some or all of the functionality of a system, subscriber unit, subscriber station, mobile station, mobile, wireless terminal, device, remote station, remote terminal, access terminal, user terminal, terminal, wireless communication device, wireless communication apparatus, user agent, user device, or user equipment (UE). A mobile device may be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card and/or another processing device for communicating over a wireless system.

Although the client device 102 and the network 104 (e.g., a secure network, or a secure server) are illustrated as communicating through a wireless connection, the connection may be wired according to some implementations. Further, although illustrated as a single client device 102 and a single network 104 for purposes of simplicity, there may be more than one client device 102 and more than one network 104, according to various implementations.

The client device 102 may include an intelligence manager 108 that may be a physical device integrated, at least in part, on the client device 102. According to some implementations, the intelligence manager 108 may be a virtual device. The physical device and/or the virtual device may include specialized programs that, when executed, cause the client device 102 to perform the various aspects disclosed herein. In some instances, the intelligence manager may also be referred to as an intelligence device, an intelligence chip, or the like.

In accordance with an implementation, the intelligence manager 108 may be configured to secure any network (e.g., the network 104) from an intruder attempting to establish a connection to that network. For example, each device attempting to connect to the network may include features of respective intelligence managers in order to provide security for the network.

Additionally or alternatively, the intelligence manager 108 may be configured to assist with identification of fraud and unauthorized transactions by a user device (e.g., the client device 102) that has already been authenticated on the network 104. For example, when a client device that is already connected to the network attempts to initiate a transaction, the intelligence manager 108 may transmit a positive response or a negative response (based on a self-learning protocol) to the network. According to an implementation, the positive response or negative response may be communicated to a security server 110 associated with the network 104. Based on a positive response from the intelligence manager 108, the client device 102 may be authorized to proceed with the requested operation. Based on a negative response from the intelligence manager 108, the client device 102 may be challenged with a next level authentication. The next level authentication may include a biometric authentication, an augmented security signature, and so forth.

It is noted that in accordance with one or more implementations described in this disclosure, users may need to opt-into the various aspects disclosed herein. Thus, one or more users may opt-out of providing personal information, demographic information, location information, proprietary information, sensitive information, biometric information, or the like in connection with data gathering aspects. Moreover, one or more implementations described herein may provide for anonymizing collected, received, and/or transmitted data. Further, a user may opt-out of providing information at any time, regardless of whether the user previously opted-in to providing the information.

In an alternative or additional implementation, the intelligence manager 108 may be configured to assist with protecting the data 106 from a compromised device and/or an unauthorized operation. For example, when the intelligence manager 108 identifies that is has been compromised and has access to the data 106, information is provided to the network 104 (or the security server 110). In a similar, but alternative implementation, the security server 110 (or a server intelligence chip) may determine the device is compromised and/or that the client should be verified.

Based on the information sent to the network 104 (or based on the network 104 autonomously determining the device is compromised), a security challenge may be transmitted to the client device 102. If the security challenge is responded to correctly based on information obtained from the intelligence manager 108, the data may be provided to the client device 102. However, if the response is incorrect and/or if an anomaly is found, a challenge is provided to the user of the client device 102. If there is a failure in responding to this challenge, the device is compromised and a current data stream may be erased, masked, or another action may be performed to protect the data (e.g., the current data stream).

In some implementations, data at the compromised device may be uploaded to a dedicated server 112 (or isolated server). According to an aspect, the dedicated server 112 may be isolated from the network 104 and the security server 110, as illustrated. However, in some implementations, the dedicated server 112 may be located, at least partially on the network 104. The data uploaded to the dedicated server 112 may include information related to the compromised device.

Further, this information may be provided to other devices 114 and respective intelligence managers 116 that are connected to the network 102. In addition, a request may be transmitted to the other devices requesting these others devices 114 to refrain from making a connection to the compromised device and its intelligence manager.

The other devices 114 may be other customers or merchants of a financial entity, for example. Although various aspects are discussed with respect to a client device, a user device or a device, these elements may alternatively be referred to as a "customer" or a "user." Thus, as used herein a "user" refers to a customer of the financial institution (or another type of entity) and/or one or more devices managed by the customer. A "merchant" may be a person, partnership, or corporation engaged in commerce, manufacturing, law, finance, services, or other types of activities. Such merchants may be in the form of a sole proprietor, a corporation, a limited liability partnership, or another form of business that engages in commerce. Further, the merchant may be a for-profit business or a not-for-profit business.

The financial entity may have a relationship (e.g., a financial relationship) with the customer. For example, the customer may have a financial account that is serviced by the financial entity. Examples of financial accounts include, but are not limited to, a savings account, a checking account, a certificate of deposit, a money market account, a mortgage, a loan, investments, insurance, debit card, credit card, and so on.

Additionally or alternatively, the merchants may have respective financial relationships with the financial entity. Thus, one or more merchants may be a customer of the financial institution. However, in accordance with some aspects, a merchant might not be a customer of the financial entity. Thus, there may be a business relationship between the financial entity and the merchant based on the various aspects disclosed herein. For example, a merchant may provide an incentive in order for the financial entity to provide (e.g., recommend, automatically implement, and so on) goods and/or service offered by the respective merchant to the customer, which may economically benefit both the merchant and the financial entity.

Figure 2:
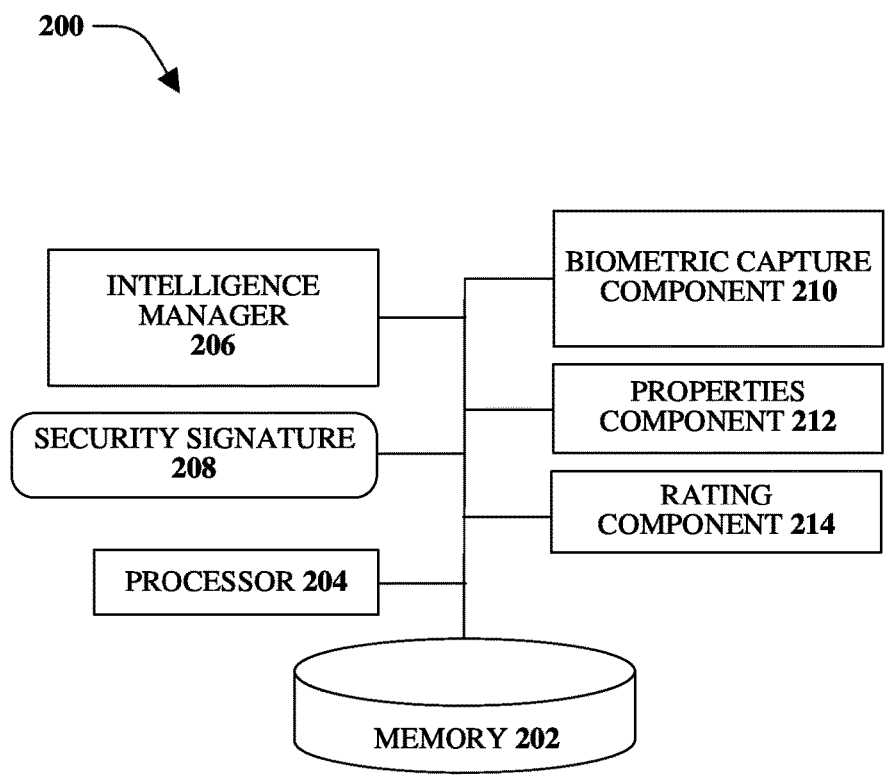
FIG. 2 illustrates an example, non-limiting system configured to provide threat identification, prevention, and remedy, according to an aspect.

FIG. 2 illustrates an example, non-limiting system 200 configured to provide threat identification, prevention, and remedy, according to an aspect. According to some implementations, the system 200 may be included, at least partially, on a device (e.g., the client device 102 of FIG. 1).

The system 200 may include at least one memory 202 that may store computer executable components and/or computer executable instructions. The system 200 may also include at least one processor 204, communicatively coupled to the at least one memory 202. The at least one processor 204 may facilitate execution of the computer executable components and/or the computer executable instructions stored in the memory 202. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the memory 202 (e.g., operatively connected to the memory 202), the various aspects are not limited to this implementation. Instead, in accordance with various implementations, the one or more computer executable components and/or the one or more computer executable instructions may be stored in (or integrated within) the memory 202. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

From a security perspective, identification of a threat may be the first step for mitigating and/or responding to the threat. Thus, threat identification may be used as preventive mechanism from an attack to a network (e.g., the network 104 of FIG. 1). The system 200 may include an intelligence manager 206 (e.g., the intelligence manager 108 of FIG. 1) that may be configured to secure the network from an intruder trying to establish a connection with the network. For example, when a user attempts to connect their device to the network, a consideration may be whether the specific device (e.g., the client device) is properly configured and is genuinely an authenticated and authorized device in the network.

Any new device trying to connect to the network may be asked for a security signature 208, which may be generated by the intelligence manager 206. The security signature 208 may be transmitted to the network (e.g., the network 104 or security server 110 of FIG. 1), using a same communication channel as the request to connect to the network. The security signature 208 may be authenticated and/or verified at the network (e.g., at a security layer). If the authentication is successful, the new device is allowed to connect to the network. If the authentication is not successful, connection to the network is denied. In this case, the device is not authenticated or not authorized to connect to the network.

The intelligence manager 206 may be a self-learning device that learns or obtains knowledge from various parameters or dimensions. These parameters may include a location (e.g., a geographic location, which may be identified by geographic coordinates or through other criteria, such as a physical address or based on nearby, known locations). Other parameters may include time zones, a Uniform Resource Locator (URL) associated with the device, a Uniform Resource Identifier (URI) associated with the device, input behavior, and so on. The input behavior may include various factors including, but not limited to, typing speed, pressure on a touch screen, and so forth.

According to some implementations, biometric information may be utilized by the intelligence manager 206 to generate the security signature 208. Thus, a biometric capture component 210 may be configured to obtain various biometric data associated with a user of the device. The biometric data may include heartbeat, heart rhythm, breathing rate, speaking patterns, iris scan, fingerprint, finger contour, gait, body temperature, and so forth.

Additionally or alternatively, device parameters may be captured by a properties component 212, and utilized by the intelligence manager 206 to generate the security signature 208. The device parameters may include information associated with the device, which may be static parameters. According to some implementations, the device parameters may be utilized in combination with one or more other parameters in order to generate the security signature 208.

Once the information is available, any deviation from the parameters (or dimensions) may be a signal that indicates someone else (e.g., not the owner or authorized user of the device) might be attempting to gain access to the network. In some implementations, the deviation may indicate it is a device different from an expected device and/or a person different from an expected person.

For example, the security layer (at the network) has the historical information for the parameters of the intelligence manager 206. Thus, the network may autonomously determine that the device may be compromised. Further, the intelligence manager 206 creates the signature based on what is currently happening and based on a challenge received from the network.

According to some implementations, a rating component 214 may be configured to define a score for each parameter or dimension (e.g., location, heartbeat, and so on). If the score for a single parameter or for a combination of parameters falls below a threshold value, a challenge may need to be output for further verification (e.g., a second level of authentication). In some aspects, the specific client signature may be ranked. Thus, the score and a biometric may be utilized to create the signature. The biometric provides added security because it may be difficult to replicate a human, but it may be easy to replicate a device and connect to the network.

The score or rankings for each parameter or dimension may be different for different users/devices or for different circumstances. For example, for a first user the biometrics may rank higher for the overall score, but for someone else another parameter may rank higher for their overall score. The intelligence manager 208 or the rating component 214 may be configured to determine the rankings based on known conditions, historical information, or based on other considerations.

Figure 3:
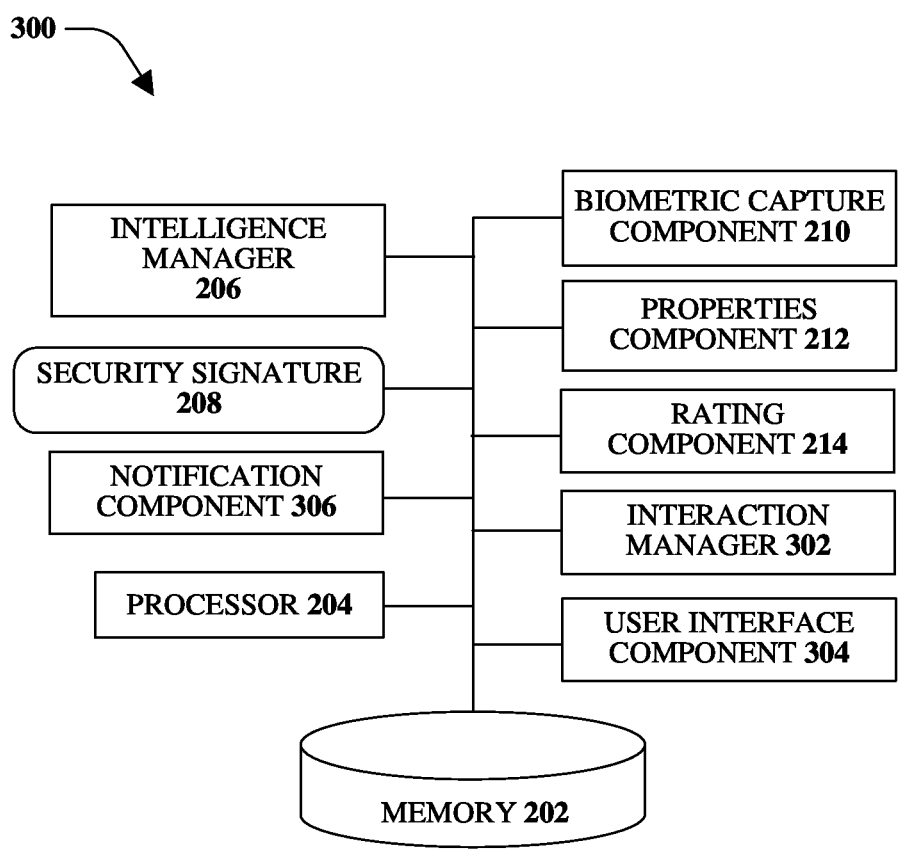
FIG. 3 illustrates an example, non-limiting system for identifying fraud and unauthorized transactions, according to an aspect.

FIG. 3 illustrates an example, non-limiting system 300 for identifying fraud and unauthorized transactions, according to an aspect. The system 300 may be included, at least partially, on a user device. Although complicated systems may be developed in order to prevent fraud, hackers may still try to break these systems and, at times, may be successful. In order to prevent fraud, the disclosed aspects identify when an unauthorized device/user has intruded into the network and how to mitigate the damage that may be caused by this unauthorized device/user.

For example, when a device (e.g., a user) that is already connected to the network tries to initiate a transaction, the intelligence manager 206 may send a positive response or a negative response to the network (e.g., an enterprise security server). The determination of whether the response is positive or negative is a function of self-learning features associated with the intelligence manager 206. For example, if the parameters/dimensions are about what is expected, the response may be positive. However, if the parameters/dimensions are not what is expected, the response may be negative.

Thus, according to various aspects, there may be an existing device (e.g., known to the network) that has been properly authenticated and is on the network. However, due to various circumstances, someone is trying to get into the network using this existing device. For example, a user may has logged into the network and stepped away from their device (e.g., at the office, in a coffee shop, and so on). After the user has stepped away, another person gains access to the unsecured device and attempts to initiate an interaction (e.g., a financial transaction, downloading customer data, downloading transaction data, and so on). Since the device has already been authenticated on the network, this other data may be accessible.

To determine whether an unauthorized user has gained access to a device on the network, there may be noticeable changes to the biometric information and/or changes to the type of interaction being performed with the network. Either of these noticeable changes may result in additional security procedures being dynamically implemented.

According to an implementation, an interaction manger 302 may be configured to identify a suspect interaction between the device and the network. The transaction may be identified as suspect if the user has not previously performed that interaction. For example, a user may historically log into the network and obtain personal information, such as account balance or recent transactions and then logs off. However, in a current situation, the user may be requesting different information or a different record (e.g., an unusual pattern). Since this is unusual for this user, the interaction manager 302 may provide an indication that the transaction is suspect.

Alternatively or additionally, the biometric capture component 210 may obtain biometric information that indicates a change to the biometric information. Since each person's biometrics or behaviors may be unique, the information obtained by the biometric capture component 210 may indicate whether the user of the device is the actual user. For example, there may be a difference in typing speed captured by the device, such as at a user interface component 304. Thus, the user's behavior has changed.

Based on the determination by the interaction manager 302 and/or the biometric capture component 210, a signal or other indication may be sent to the network indicating that the user is suspect. The signal or other indication may be transmitted over a channel (e.g., http channel) that is different from a normal (e.g., commonly used, currently used) transaction channel. Thus, the transaction may be occurring over a first channel and the indication that the user is suspect may be occurring over a second channel, different from the first channel.

The network may response to device, over the second channel, with a security challenge. According to some implementations, the intelligence manager 206 may respond to the challenge without the user being aware that a handshake between the device and the network is occurring. However, according to other implementations, the challenge is output to the user for one or more actions to be performed by the user.

As discussed with respect to FIG. 2, a user device may request access to a network and, if the device is a new device, the new device may respond to the network with a security signature that is sent over the same channel as the access request. Once the user device has access to the network (regardless of whether the user device was automatically authenticated or if a security signature was utilized as discussed above), there may be circumstances where a user and/or a transaction is suspect. Therefore, an indication may be sent to the network over a different channel to make the network aware that there may be fraud occurring and for action to be taken.

Various actions may be performed based on the indication that the device may have been compromised. For example, the intelligence manager 206 may run a scan program at the client device to determine if the device has been compromised. The scan program may be configured to obtain various information about the user and/or inputs received. For example, the user's heartbeat and breathing rate may be high and an indication sent to the system. However, when the intelligence manager 206 runs the scan program, the heartbeat and breathing rate may have returned to normal (e.g., the user was running when the suspect biometric was obtained), thus, the user is no longer considered as a suspect user. Thus, no further action is performed until another suspect condition occurs, mitigating false positives related to a compromised device.

According to some implementations, a notification component 306 (or the intelligence manage 206) may be configured to transmit an indication (e.g., a signal) that provides information related to the device identifier, location, and so on and warns other devices and/or networks to not connect with this particular device. Thus, the system 300 may identify a device in a specified zone that is compromised and block that device on a near real-time basis. Accordingly, the other devices, through their respective intelligence managers, may check for security to determine if they are compromised or not based on the other device being compromised.

According to some implementations, the user interface component 304 and other interface components discussed herein may provide a graphical user interface (GUI), a command line interface, a speech interface, Natural Language text interface, and the like. For example, a GUI may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, voice activation, and/or any input capturing device, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or API. In addition, the command line interface may be employed in connection with hardware (e.g., video cards) and/or displays (e.g., black and white, and EGA) with limited graphic support, and/or low bandwidth communication channels.

Figure 4:
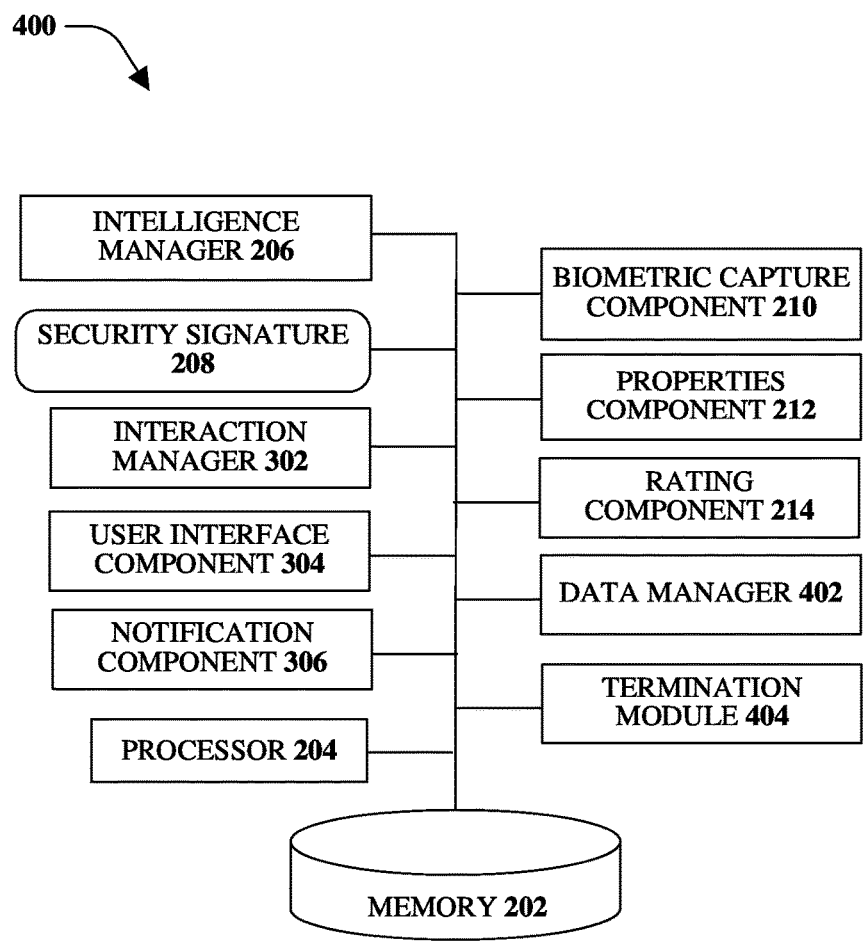
FIG. 4 illustrates an example, non-limiting system for protecting data from a compromised device and/or an unauthorized operation, according to an aspect.

FIG. 4 illustrates an example, non-limiting system 400 for protecting data from a compromised device and/or an unauthorized operation, according to an aspect. The system 300 may be included, at least partially, on a user device. In some instances, a device may be authenticated on the network and initiates an unauthorized transaction. A data manager 402 may be configured to determine whether the device is attempting to download data not authorized for that device. For example, a person may be attempting to download a large amount of data (e.g., customer data, transaction data, and so on). The data manager 402 may determine that it is an irregular transaction and identify the specific device as being compromised (e.g., may notify the network). According to some implementations, the network may determine that the device may be compromised and/or that the device should be verified, without receiving an indication from the device.

In this case, the download has already been initiated and data is scheduled to be sent to the device. A security challenge is conveyed to the device. The security challenge may be dynamic and different security challenges may be chosen based on the situation, device, or based on other considerations. In an example, the security challenge may be to identify the last location when data was transmitted. The security challenge may be initiated at the network side, according to some implementations.

The security challenge may be output on the device. However, according to some implementations, the security challenge may be output on another device associated with the user. For example, the security challenge may be output via email, to a smart phone, to a laptop, or to another device authorized with the network and associated with the user (e.g., a user may have more than one device that they control and have registered with the network).

The device that receives the challenge may attempt to respond to the challenge using information that is known by the intelligence manager 206. If an anomaly is found, a security challenge may be output to the user. If the response is still incorrect or not what is expected, a termination module 404 may be configured to cancel the transaction. For example, the termination module 404 may cause the device to disconnect from an existing channel (e.g., disconnects a current wireless and/or wired connection). Further, the termination module or the data manager 402 may be configured to identify and remove all data downloaded for this transaction from the device. According to some implementations, if the data is not removable, the data may be masked or otherwise rendered inoperable at the device.

According to some implementations, the notification component 206 may be configured to gather statistics related to the transaction and convey the statistics to a dedicated server. The statistics may include parameters related to the transaction, an identification of the client device, or combinations thereof. The statistics may be utilized to identify a pattern or other information related to the threat. For example, the statistics may be obtained over time from multiple sources and a pattern may be identified. Based on this identified pattern, information may be conveyed to respective intelligence managers within the network in an attempt to mitigate theft.

In accordance with some implementations, if a network is hacked (e.g., a financial entity), the information (e.g., statistics) may be conveyed to partners of the financial entity. Thus, the partners are alerted to the specific attack and may take preventive measures to mitigate theft from the attack.

Figure 5:
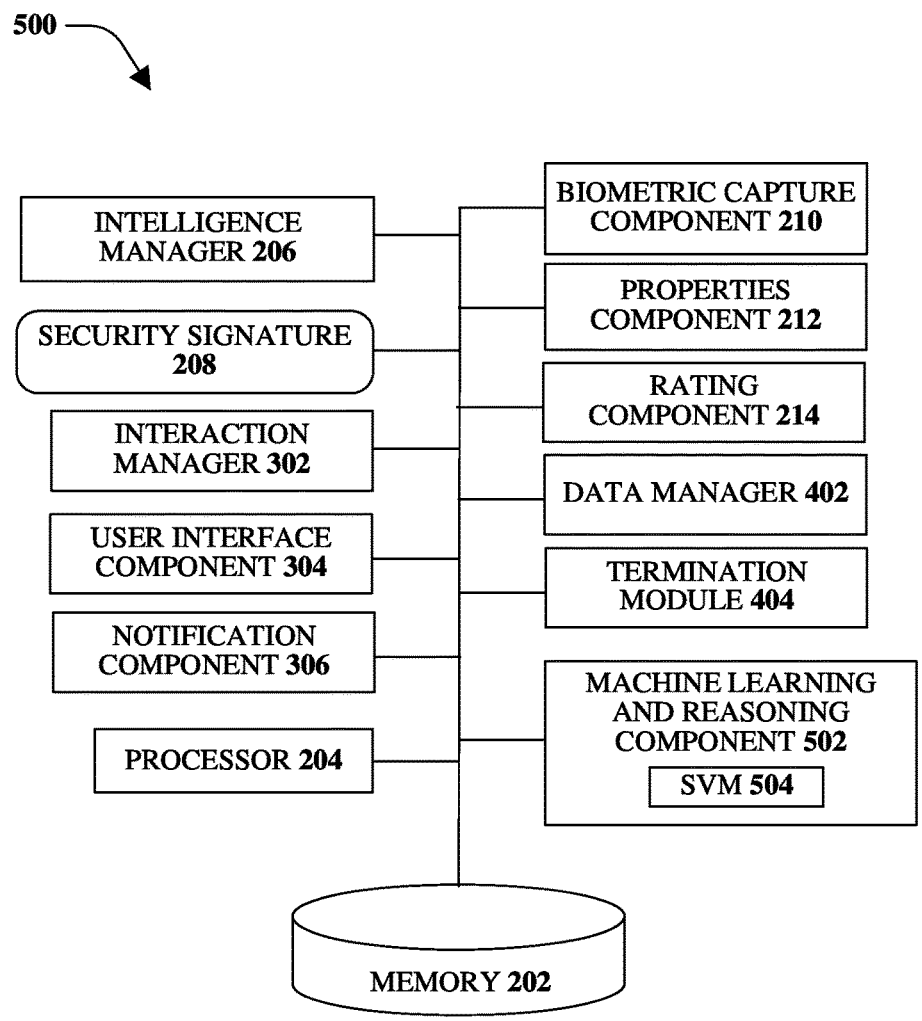
FIG. 5 illustrates an example, non-limiting system that employs automated learning to facilitate one or more of the disclosed aspects.

FIG. 5 illustrates an example, non-limiting system 500 that employs automated learning to facilitate one or more of the disclosed aspects. The system 300 may be included, at least partially, on a user device. For example, a machine learning and reasoning component 502 may be utilized to automate one or more of the disclosed aspects. The machine learning and reasoning component 502 may employ automated learning and reasoning procedures (e.g., the use of explicitly and/or implicitly trained statistical classifiers) in connection with providing threat identification, prevention, and remedy in accordance with one or more aspects described herein.

For example, the machine learning and reasoning component 502 may employ principles of probabilistic and decision theoretic inference. Additionally or alternatively, the machine learning and reasoning component 502 may rely on predictive models constructed using machine learning and/or automated learning procedures. Logic-centric inference may also be employed separately or in conjunction with probabilistic methods.

The machine learning and reasoning component 502 may infer actions or events that should be implemented by obtaining knowledge about the device, user, or other parameters or dimensions associated with an interaction with the network. According to some implementations, the knowledge may be about the user (e.g., medical conditions, heart beat pattern, and so on). Further, the knowledge may be based on input characteristics, such as typing speed, pressure applied to a touch screen, and so forth. The knowledge may also be based on various other parameters, such as location, device identification, device capabilities, and so on. Based on the various forms of knowledge, the machine learning and reasoning component 502 may make an inference based on whether to allow a device to connect to a network, whether to continue a session already connected to the network, whether to allow data to be downloaded or continue to be downloaded to the device, or combinations thereof.

As used herein, the term "inference" refers generally to the process of reasoning about or inferring states of the system, a component, a module, the environment, and/or user devices from a set of observations as captured through events, reports, data and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

If the machine learning and reasoning component 502 has uncertainty related to whether a certain parameter or dimension is suspect, the machine learning and reasoning component 502 may automatically engage in a short (or long) dialogue or interaction with the user (e.g., security challenges, second level authentication, and so on). In accordance with some aspects, the machine learning and reasoning component 502 engages in the dialogue with the user through another system component. Computations of the value of information may be employed to drive the asking of questions.

The various aspects (e.g., in connection with identifying a security threat, preventing a security threat, and/or remedying a security threat) may employ various artificial intelligence-based schemes for carrying out various aspects thereof. For example, a process for determining if a particular action should follow a current action may be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification may employ a probabilistic and/or statistical-based analysis (e.g., factoring into the analysis utilities and costs) to prognose or infer an action that should be employed to determine what actions should be automatically performed what actions should be performed after receiving confirmation from the user to proceed. In the case of actions/events, for example, attributes may be identification of a user device and/or the user and the classes are criteria related to known information (e.g., historical information) about the user device and/or user.

The machine learning and reasoning component 502 may include a support vector machine (SVM) 504, which is an example of a classifier that may be employed. The SVM 504 operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing fraud trends, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria when to provide a security challenge, when to provide a second level authentication, the relative ranking of various parameters or dimensions, and so forth. The criteria may include, but is not limited to, historical information, user preferences, expected actions, and so forth.

Additionally or alternatively, an implementation scheme (e.g., a rule, a policy, and so on) may be applied to control and/or regulate events and resulting recommendations, subsequent events, and so forth. In some implementations, based upon a predefined criterion, the rules-based implementation may automatically and/or dynamically implement one or more security challenges or levels. In response thereto, the rule-based implementation may automatically interpret and carry out functions associated with the security challenge by employing a predefined and/or programmed rule(s) based upon any desired criteria.

Methods that may be implemented in accordance with the disclosed subject matter will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 6:
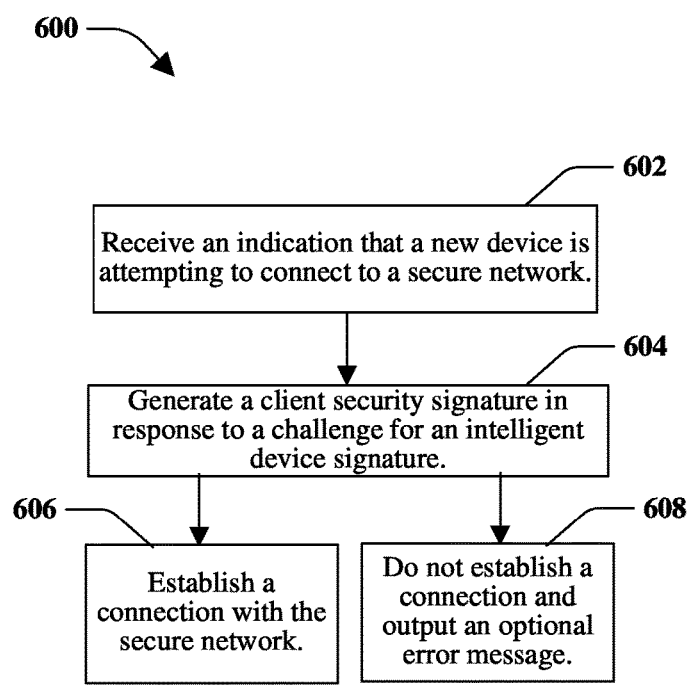
FIG. 6 illustrates an example, non-limiting method for providing threat identification, according to an aspect.

FIG. 6 illustrates an example, non-limiting method 600 for providing threat identification, according to an aspect. The method 600 in FIG. 6 may be implemented using, for example, any of the systems, such as the system 200 (of FIG. 2), described herein. The method 600 may be implemented at about the same time as a device attempts to establish a connection with a network. Further, according to some implementations, the method 600 is implemented by an intelligence manager or another component installed on the device.

The method 600 starts at 602 when an indication is received that a device is attempting to connect to a network. The indication may be based on a determination the device has not previously been connected to the network (e.g., it is a new device). For example, the device may be a new device for the user (e.g., a new smart phone, a new appliance, and so on). The network may be an enterprise network and, in a specific example, the network may be associated with a financial entity.

At 604, a client signature is generated in response to a challenge for an intelligent device signature. The challenge may be received from an enterprise security layer. Generating the client signature may include using biometric information of the user, behavioral information of the user, device parameters, geographic information, or combinations thereof. For example, an intelligence manager may generate the signature based on data received and/or based on data inferred based, at least in part, on received data.

If the client signature matches an expected signature, a connection is established between the device and the network, at 606. If the client signature does not match an expected signature, a connection is not established and a notification may be output, at 608. According to some implementations, the client security signature may be analyzed and/or verified by an enterprise security layer (e.g., network).

Figure 7:
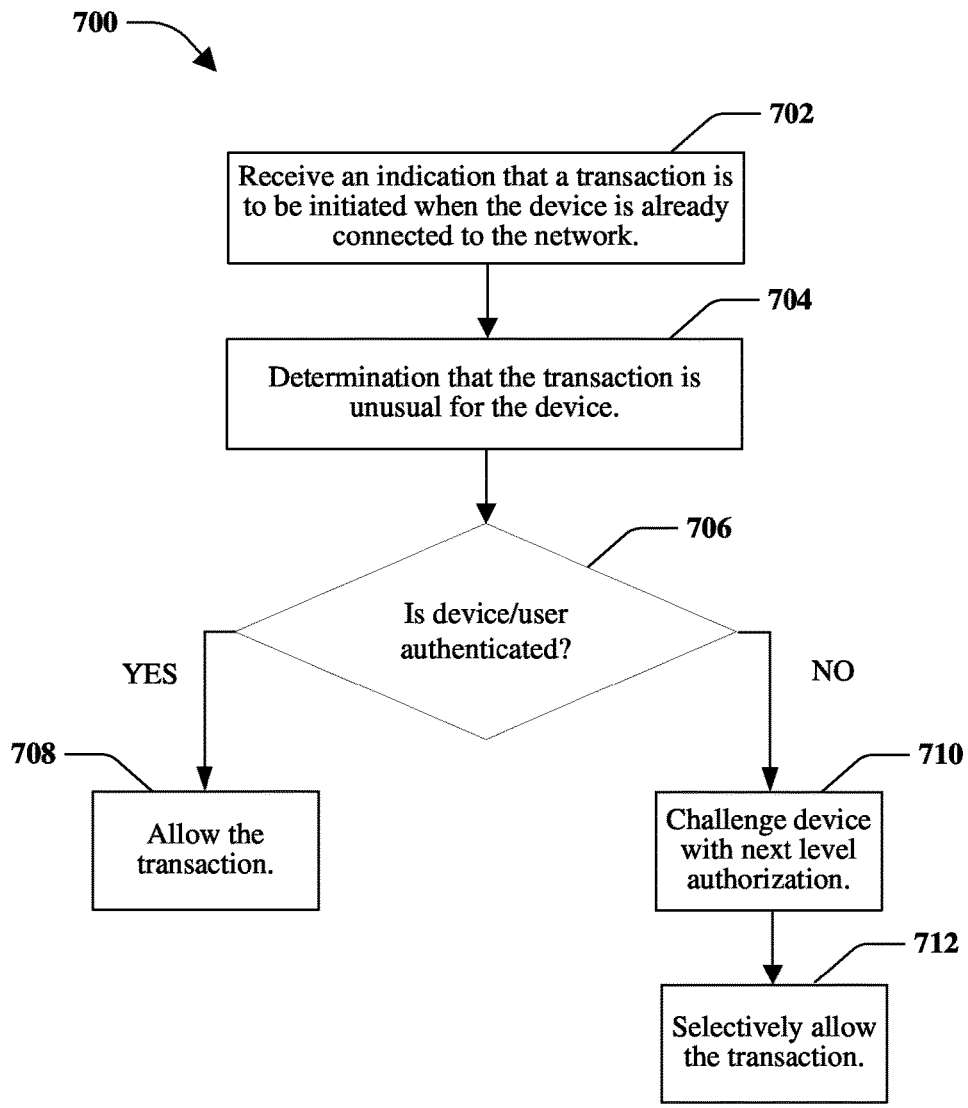
FIG. 7 illustrates an example, non-limiting method for providing theft prevention, according to an aspect.

FIG. 7 illustrates an example, non-limiting method 700 for providing theft prevention, according to an aspect. The method 700 in FIG. 7 may be implemented using, for example, any of the systems, such as the system 300 (of FIG. 3), described herein. The method 700 may be utilized after a device has already been authenticated on the network.

The method 700 starts at 702, when a transaction is initiated on a device after the device is connected to the network. At 704, a determination is made that the transaction is unusual for the user/device or that there is something suspicious related to the transaction. For example, the user may have historically utilized the network to check account balances, make a deposit, or to do other transactions. However, in this example, the user is attempting to perform a different transaction (e.g., transfer money).

Therefore, based on the determination of 704, at 706, another determination is made whether the device and/or user is authenticated. For example, the determination may include evaluating a current parameter or dimension associated with the user/device. If the current parameter is substantially the same as an expected parameter, the transaction may be allowed at 708.

Alternatively, if the current parameter is not substantially the same as the expected parameter, the connected device is challenged with a next level authentication, at 710. According to an implementation, the challenge may be provided over a channel that is different from the channel on which the transaction is being performed. The challenge may include biometrics, an augmented security signature, and so forth. According to some aspects, an intelligent device signature is utilized, wherein authorization is based on device, behavioral, geographic, and/or biometric parameters for user operations.

Depending on the response to the challenge, the transaction is selectively allowed, at 712. For example, if the response is an expected response, the transaction is allowed to continue. However, if the response is not the expected response, the transaction may be denied. In such a manner, the method 700 enables enterprises to prevent unauthorized operations performed in the network.

Figure 8:
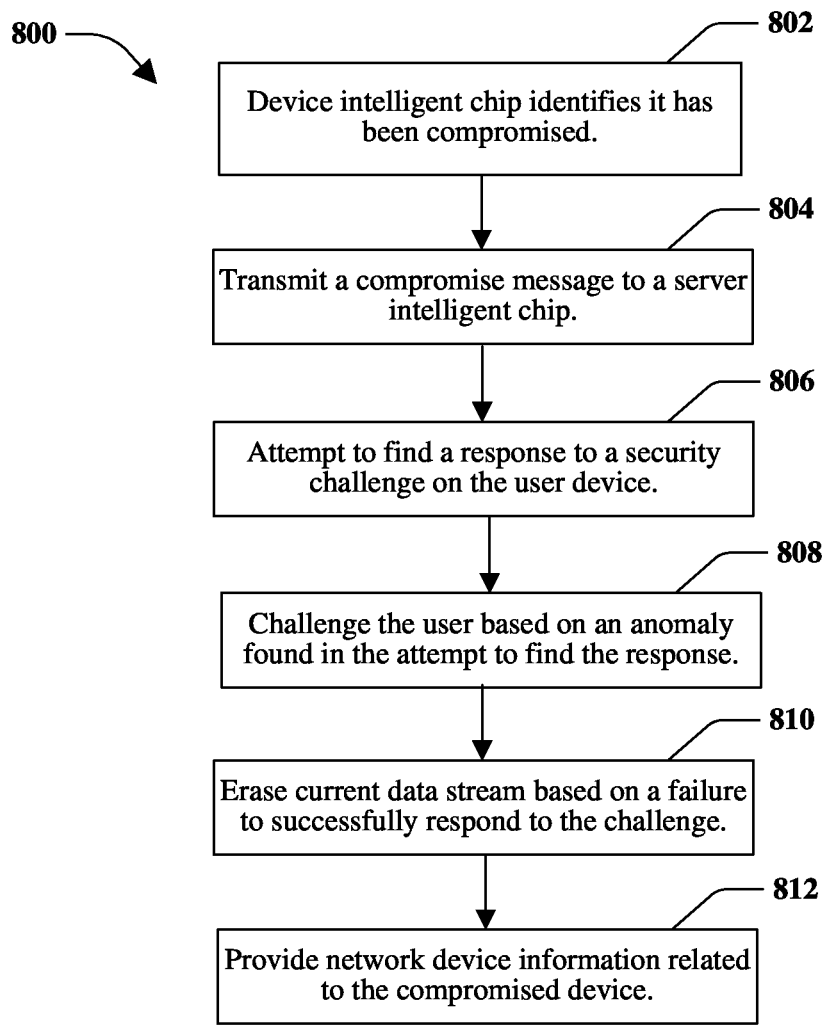
FIG. 8 illustrates an example, non-limiting method for providing data protection, according to an aspect.

FIG. 8 illustrates an example, non-limiting method 800 for providing data protection, according to an aspect. The method 800 in FIG. 8 may be implemented using, for example, any of the systems, such as the system 400 (of FIG. 4), described herein. The method 800 may be configured to help protect data from a compromised device and/or from an unauthorized operation.

The method 800 starts, at 802, when a device intelligent chip identifies that it has been compromised and has access to information. Based on this, at 804, the client (e.g., device) transmits a compromise message to a server intelligent chip (e.g., at the network). The server may analyze the most appropriate security challenge based on the client intelligence gathered and conveys the security challenge to the user device.

At 806, an intelligence manager on the user device attempts to find the answer to the security challenge with the existing information on the device intelligence chip. Provided the answer may be found, the answer is conveyed to the server. However, if there is an anomaly found, at 808, the client intelligent chip challenges the user.

If the challenge fails (e.g., user does not successfully respond to the challenge), at 810 a current data stream may be erased from the device, masked on the device, rendered corrupt, or another action performed so that the data stream is not compromised or the amount of data compromised is mitigated.

Further, according to some implementations, at 812, the data at the compromised device is uploaded to an isolated server (or dedicated server) and a warning alert is broadcast to all intelligent chips in the network. The warning alert may instruct the intelligent chips to refrain from making a connection to the compromised device and strengthen the security for devices, which might have probability of the threat and update a new threat pattern to the intelligence device.

Figure 9:
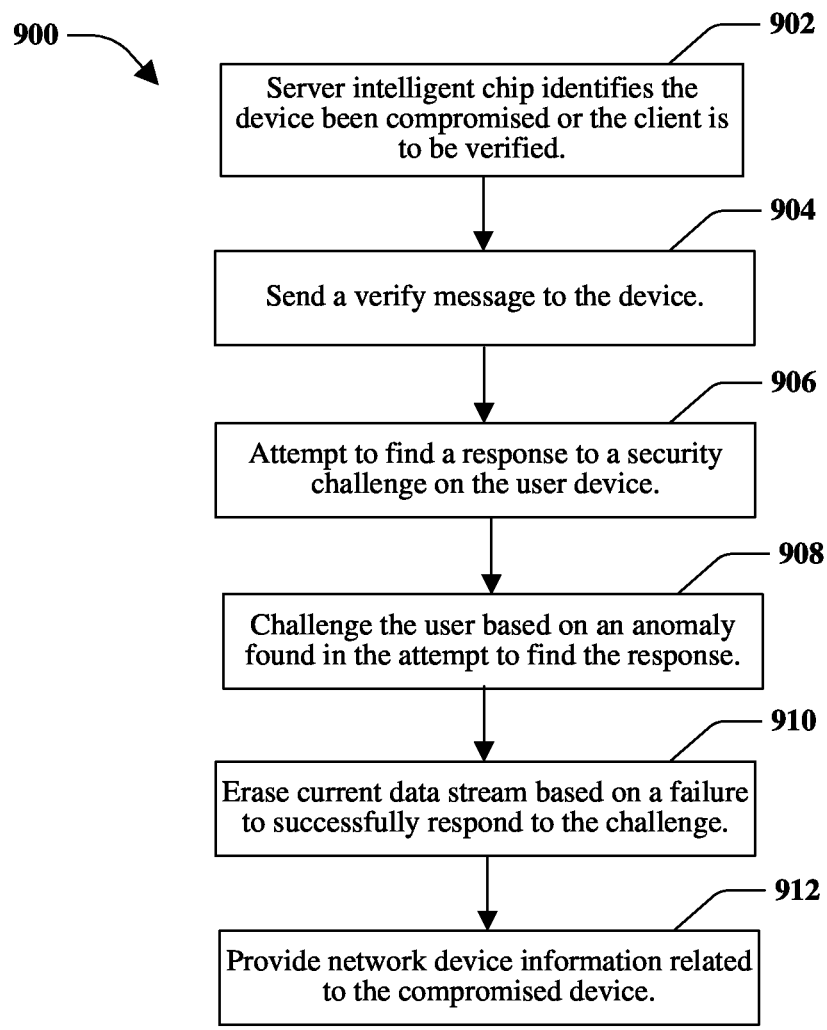
FIG. 9 illustrates an example, non-limiting method for providing data protection, according to an aspect.

FIG. 9 illustrates an example, non-limiting method 900 for providing data protection, according to an aspect. The method 900 in FIG. 9 may be implemented using, for example, any of the systems, such as the system 400 (of FIG. 4), described herein. The method 900 may be configured to help protect data from a compromised device and/or from an unauthorized operation.

The method 900 being at 902, when a server intelligent chip identifies that the device has been compromised or that there is a need to verify the client. Therefore, at 904, a verify message is sent to the device. The message may be sent from a server intelligent chip (on the network) to a client intelligent chip (on the user device). Further, the verify message may be transmitted with the most appropriate security challenge determined based on the client intelligence gathered. The verify message and the security challenge are conveyed to the client chip.

The client intelligent chip attempts to find an answer to the security challenge among the existing information on the intelligent chip, at 906. If an anomaly is found, the client intelligent chip challenges the user, at 908.

If the challenge fails, the client intelligent chip may erase a current data stream, at 910. The challenge may fail if the user does not successfully respond to the challenge. In some implementations, the current data stream may be masked on the device, rendered corrupt, or another action performed so that the data stream is not compromised (e.g., access to the data is prevented).

Further, according to some implementations, at 912, the data at the compromised device may be uploaded to an isolated server (or dedicated server) and a warning alert may be broadcast to all intelligent chips in the network. The warning alert may instruct the intelligent chips to refrain from making a connection to the compromised device. The data uploaded to the isolated server is the data necessary to identify the compromised device.

Figure 10:
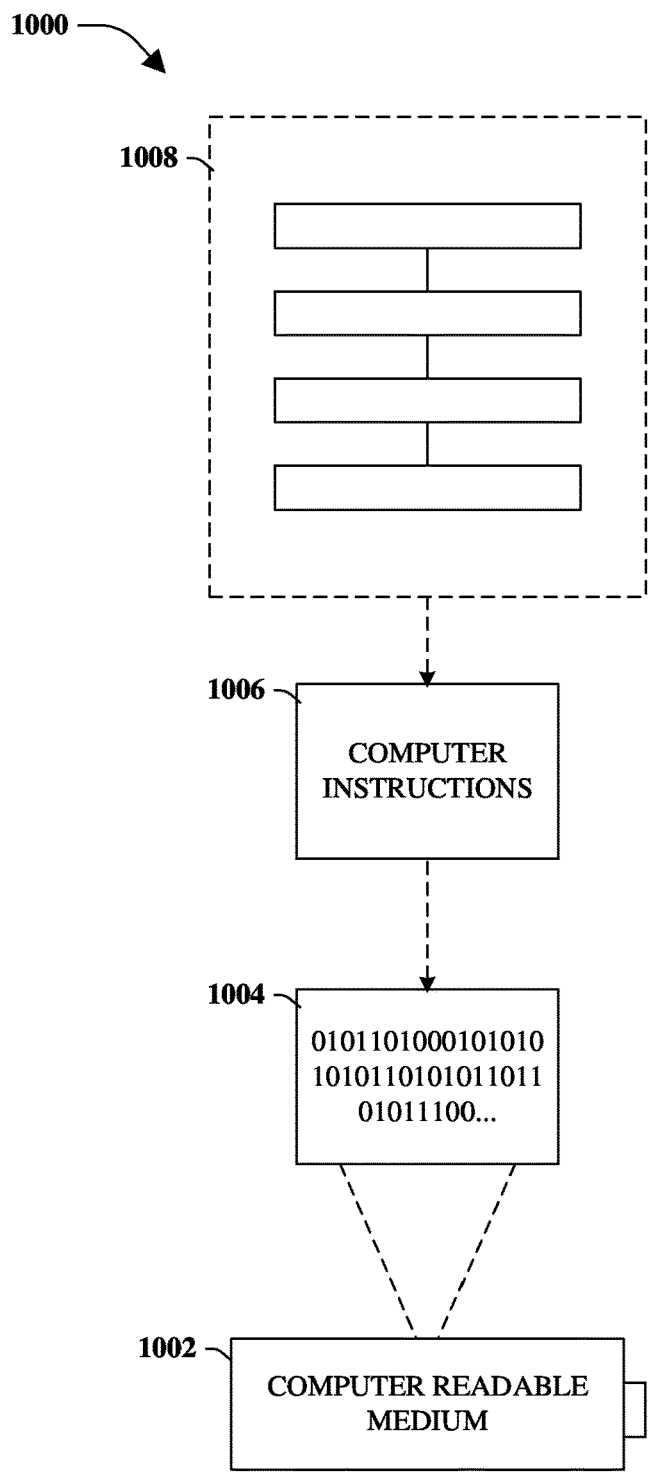
FIG. 10 illustrates an example, non-limiting computer-readable medium or computer-readable device including processor-executable instructions configured to embody one or more of the aspects set forth herein.

One or more implementations include a computer-readable medium including processor-executable instructions configured to implement one or more embodiments presented herein. An embodiment of a computer-readable medium or a computer-readable device devised in these ways is illustrated in FIG. 10, wherein an implementation 1000 includes a computer-readable medium 1002, such as a CD-R, DVD-R, flash drive, a platter of a hard disk drive, and so forth, on which is encoded computer-readable data 1004. The computer-readable data 1004, such as binary data including a plurality of zero's and one's as illustrated, in turn includes a set of computer instructions 1006 configured to operate according to one or more of the principles set forth herein.

In the illustrated embodiment 1000, the processor-executable computer instructions 1006 may be configured to perform a method 1008, such as the method 600 of FIG. 6 and/or the method 700 of FIG. 7, for example. In another embodiment, the processor-executable instructions 1004 may be configured to implement a system, such as the system 200 of FIG. 2 and/or the system 300 of FIG. 3, for example. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 11:
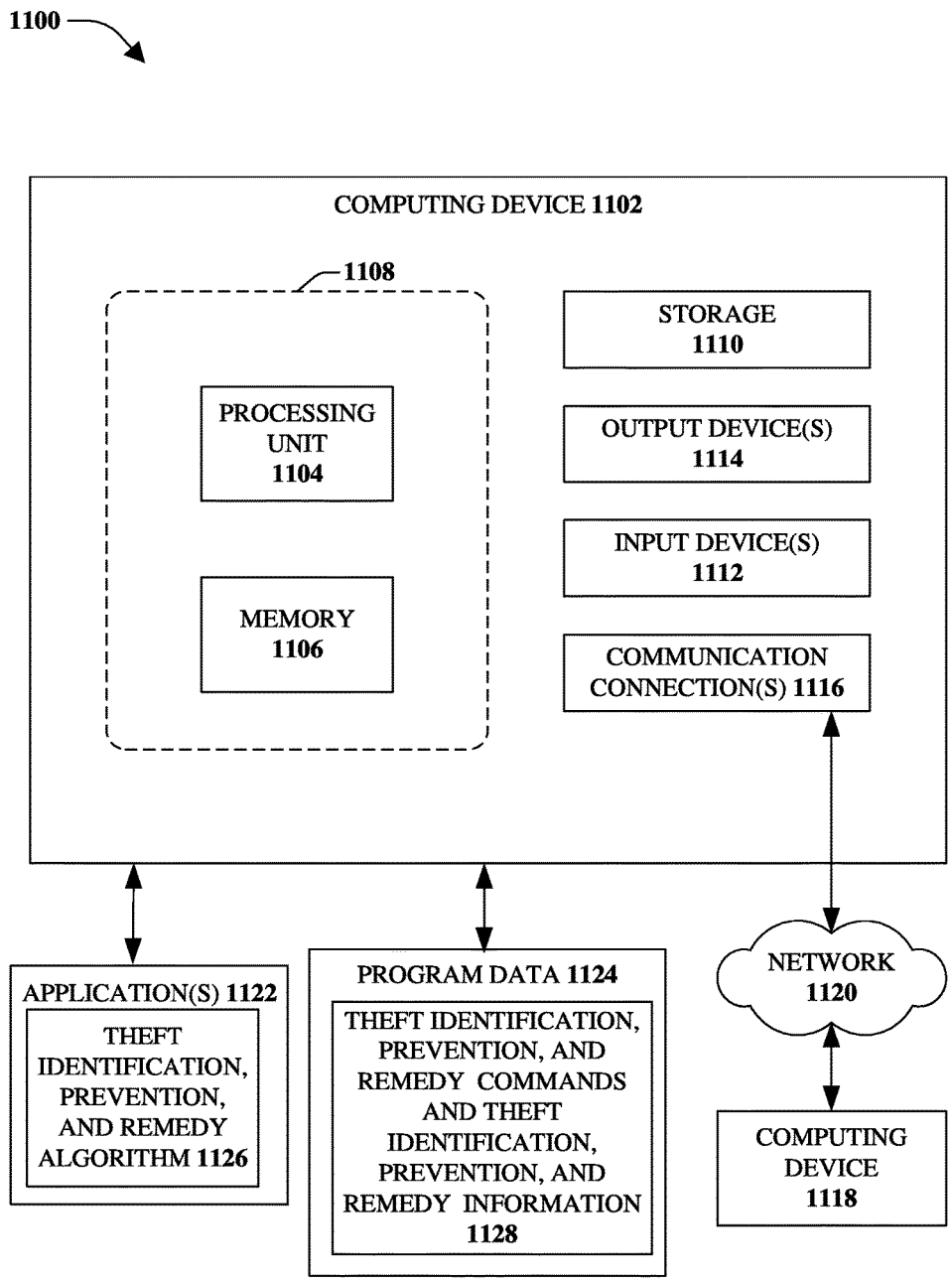
FIG. 11 illustrates an example, non-limiting computing environment where one or more of the aspects set forth herein are implemented, according to one or more aspects.

FIG. 11 and the following discussion provide a description of a suitable computing environment to implement embodiments of one or more of the aspects set forth herein. The operating environment of FIG. 11 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 11 illustrates a system 1100 that may include a computing device 1102 configured to implement one or more embodiments provided herein. In one configuration, the computing device 1102 may include at least one processing unit 1104 and at least one memory 1106. Depending on the exact configuration and type of computing device, the at least one memory 1106 may be volatile, such as RAM, non-volatile, such as ROM, flash memory, etc., or a combination thereof. This configuration is illustrated in FIG. 11 by dashed line 1108.

In other embodiments, the device 1102 may include additional features or functionality. For example, the device 1102 may include additional storage such as removable storage or non-removable storage, including, but not limited to, magnetic storage, optical storage, etc. Such additional storage is illustrated in FIG. 11 by storage 1110. In one or more embodiments, computer readable instructions to implement one or more embodiments provided herein are in the storage 1110. The storage 1110 may store other computer readable instructions to implement an operating system, an application program, etc. Computer readable instructions may be loaded in the at least one memory 1106 for execution by the at least one processing unit 1104, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 1102 may include input device(s) 1112 such as keyboard, mouse, pen, voice input device, touch input device, infrared cameras, video input devices, or any other input device. Output device(s) 1114 such as one or more displays, speakers, printers, or any other output device may be included with the device 1102. The input device(s) 1112 and the output device(s) 1114 may be connected to the device 1102 via a wired connection, wireless connection, or any combination thereof. In one or more embodiments, an input device or an output device from another computing device may be used as the input device(s) 1112 and/or the output device(s) 1114 for the device 1102. Further, the device 1102 may include communication connection(s) 1116 to facilitate communications with one or more other devices, illustrated as a computing device 1118 coupled over a network 1120.

One or more applications 1122 and/or program data 1124 may be accessible by the computing device 1102. According to some implementations, the application(s) 1122 and/or program data 1124 are included, at least in part, in the computing device 1102. The application(s) 1122 may include a threat identification, prevention, and remedy algorithm 1126 that is arranged to perform the functions as described herein including those described with respect to the system 400 of FIG. 4. The program data 1124 may include a threat identification, prevention, and remedy commands and a threat identification, prevention, and remedy information 1128 that may be useful for operation with value-added services that provide cyber security as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
   a processor that executes the following computer executable components stored in a memory:
   an intelligence manager, installed on a client device, that verifies an identity of the client device and a user of the client device for access to a secure network;
   a score component that ranks static and dynamic inputs of the device and the user to generate an active score that serves as a signature;
   a data manager that determines that a transaction initiated at the client device is suspect based on the type of data requested and the amount of data requested, wherein the transaction is a financial transaction and the data is financial data, and further based on the signature;
   a machine learning component that infers dynamic inputs for input into the score component; and
   a termination module that, for the suspect transaction, selectively terminates the transaction based on a failure of a security challenge output in response to the suspect transaction, wherein the determination is based at least in part upon historical data related to the transaction and the user.

2. The system of claim 1, wherein the intelligence manager performs self-learning through the feedback of the machine learning component based on observing user behavior, user biometrics, location data, device data, input data, or combinations thereof.

3. The system of claim 1, wherein the termination module disconnects a current connection between the client device and the secure network.

4. The system of claim 1, wherein the termination module identifies data downloaded to the client device prior to the termination of the transaction and selectively removes the data from the client device.

5. The system of claim 1, wherein the termination module identifies data downloaded to the client device prior to the termination of the transaction and selectively masks the data from the client device.

6. The system of claim 1, further comprising a notification component that gathers statistics related to the transaction, wherein the statistics include parameters related to the transaction, an identification of the client device, or combinations thereof.

7. The system of claim 6, wherein the notification component conveys the statistics to a dedicated server.

8. The system of claim 6, wherein the notification component provides an alert to other intelligence managers within the network, the alert includes an identification of the client device and a request not to connect to the client device.

9. The system of claim 1, wherein the security challenge relates to parameters of the client device, input data, biometric data, location data, or combinations thereof.

10. The system of claim 1, wherein the transaction is performed over a first channel and the security challenge is output over a second channel, different from the first channel.

11. A method, comprising:
  determining, by a system comprising a processor, an active score that serves as a signature, wherein the active score is generated by a score component that ranks static and dynamic inputs of a client device and of a user;
  determining, by the system, that the client device has been compromised, wherein the determining is based at least in part on the signature;
  transmitting, by the system, a notification to a server that the client device has been compromised;
  determining, by the system, if a response to a security challenge is available, wherein the security challenge is received from the server based on the notification;
  outputting, by the system, another challenge based on the response to security challenge not being available;
  inferring, by a machine learning component, dynamic inputs for input into the determination of the active score; and
  erasing, by the system, a current data stream based on a negative response to the other challenge.

12. The method of claim 11, further comprises uploading, by the system, a set of data at the client device to an isolated server.

13. The method of claim 11, further comprises notifying, by the system, other devices within a network to refrain from establishing a communication with the client device.

14. The method of claim 11, wherein the determining the client device has been compromised comprises receiving a request to download data from the server, wherein the download data is data that is not usually accessible to the client device.

15. The method of claim 11, wherein the determining if a response to the security challenge is available comprises determining if the answer is included with information that is retained by a device intelligent chip included on the client device.

16. A method, comprising:
  determining, by a system comprising a processor, an active score that serves as a signature, wherein the active score is generated by a score component that ranks static and dynamic inputs of a client device and of a user;
  receiving, by the system, a verification message from a server based on a determination that the device has been compromised, wherein the verification message includes a security challenge, wherein the determination is based at least in part on the signature;
  determining, by the system, if a response to a security challenge is available, wherein the security challenge is received from the server;
  outputting, by the system, another challenge based on the response to the security challenge not being available;
  inferring, by a machine learning component, dynamic inputs for input into the determination of the active score; and
  removing, by the system, a current data stream based on a negative response to the other challenge.

17. The method of claim 16, further comprises uploading, by the system, a set of data at the client device to an isolated server.

18. The method of claim 16, further comprises notifying, by the system, other devices within a network to refrain from establishing a communication with the client device.

19. The method of claim 16, wherein the removing the current data stream comprises masking at least a portion of the current data stream.

20. The method of claim 16, wherein the security challenge is based on gathered client intelligence.

* * * * *